United States Patent
Raghuvanshi et al.

(10) Patent No.: US 12,452,732 B2
(45) Date of Patent: Oct. 21, 2025

(54) TRAFFIC STEERING FOR NON-PUBLIC NETWORKS AND PUBLIC LAND MOBILE NETWORK CLOUDS

(71) Applicants: AT&T Intellectual Property I, L.P., Atlanta, GA (US); AT&T Mobility II LLC, Atlanta, GA (US)

(72) Inventors: Prashant Raghuvanshi, Parker, CO (US); Richard Kwapniewski, Middletown, NJ (US); Rajil Malhotra, Olathe, KS (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 749 days.

(21) Appl. No.: 17/804,421

(22) Filed: May 27, 2022

(65) Prior Publication Data
US 2023/0388854 A1 Nov. 30, 2023

(51) Int. Cl.
*H04W 28/08* (2023.01)
*H04W 48/16* (2009.01)

(52) U.S. Cl.
CPC ....... *H04W 28/0858* (2020.05); *H04W 48/16* (2013.01)

(58) Field of Classification Search
None
See application file for complete search history.

(56) References Cited

U.S. PATENT DOCUMENTS

| | | | |
|---|---|---|---|
| 2009/0264096 A1* | 10/2009 | Cai | H04W 4/24 455/406 |
| 2011/0066530 A1* | 3/2011 | Cai | H04L 12/1403 705/30 |
| 2012/0157041 A1* | 6/2012 | Cai | H04L 12/1453 455/406 |
| 2020/0245235 A1* | 7/2020 | Chun | H04W 48/18 |
| 2021/0058858 A1* | 2/2021 | Qiao | H04W 60/00 |
| 2021/0314899 A1* | 10/2021 | Shan | H04W 60/04 |
| 2022/0039177 A1* | 2/2022 | Talebi Fard | H04W 48/00 |
| 2022/0070767 A1* | 3/2022 | Qiao | H04W 28/24 |
| 2022/0086719 A1* | 3/2022 | Devlic | H04L 41/5051 |
| 2022/0338065 A1* | 10/2022 | Qiao | H04L 47/805 |
| 2023/0042948 A1* | 2/2023 | Qiao | H04L 67/143 |
| 2023/0345354 A1* | 10/2023 | Qiao | H04M 15/8038 |
| 2023/0388854 A1* | 11/2023 | Raghuvanshi | H04W 48/16 |

(Continued)

*Primary Examiner* — Faiyazkhan Ghafoerkhan
(74) *Attorney, Agent, or Firm* — Guntin & Gust, PLC; Erik Boyd

(57) ABSTRACT

Traffic steering for non-public networks and public land mobile network (PLMN) clouds is provided. A method can include retrieving, by a system comprising a processor and associated with a communication network, a subscriber profile for a user equipment in response to receiving a request from the user equipment for access to the communication network, wherein the request comprises first data network information that is distinct from second data network information associated with the communication network; and, in response to an attribute of the subscriber profile being determined to be equal to a defined value, replacing, by the system, the first data network information in the request with the second data network information and routing, by the system, the request to core network equipment of the communication network.

20 Claims, 10 Drawing Sheets

(56) References Cited

U.S. PATENT DOCUMENTS

| | | | |
|---|---|---|---|
| 2023/0388914 A1* | 11/2023 | Qiao | H04W 60/005 |
| 2024/0031231 A1* | 1/2024 | Karampatsis | H04L 41/0893 |
| 2024/0040439 A1* | 2/2024 | Qiao | H04W 28/0268 |
| 2024/0179796 A1* | 5/2024 | Kawasaki | H04W 60/06 |
| 2024/0188183 A1* | 6/2024 | Kawasaki | H04W 76/38 |
| 2024/0314058 A1* | 9/2024 | Mueck | H04L 41/40 |
| 2024/0333623 A1* | 10/2024 | Chou | H04L 12/1407 |

* cited by examiner

TRAFFIC STEERING FOR NON-PUBLIC NETWORKS AND PUBLIC LAND MOBILE NETWORK CLOUDS

TECHNICAL FIELD

The present disclosure relates to wireless communication networks, and, in particular, to techniques for facilitating traffic steering and/or routing in a configuration network.

BACKGROUND

Mobile devices, such as mobile phones or the like, can obtain communication service by connecting to one or more data networks. A common network type utilized by mobile devices is a public network such as a public land mobile network (PLMN), in which a network operator provides a consumer-grade service to the general public with connectivity to the Internet as the data network. In contrast, a Fifth Generation (5G) non-public data network (NPN, also referred to as a private network) provides 5G network services to a clearly defined user organization or group of organizations. A 5G NPN can be deployed on the defined premises of an associated organization, such as a campus or factory. Also or alternatively, an NPN can operate in a hybrid environment in which network infrastructure is shared with a public network.

DETAILED DESCRIPTION

Figure 1:
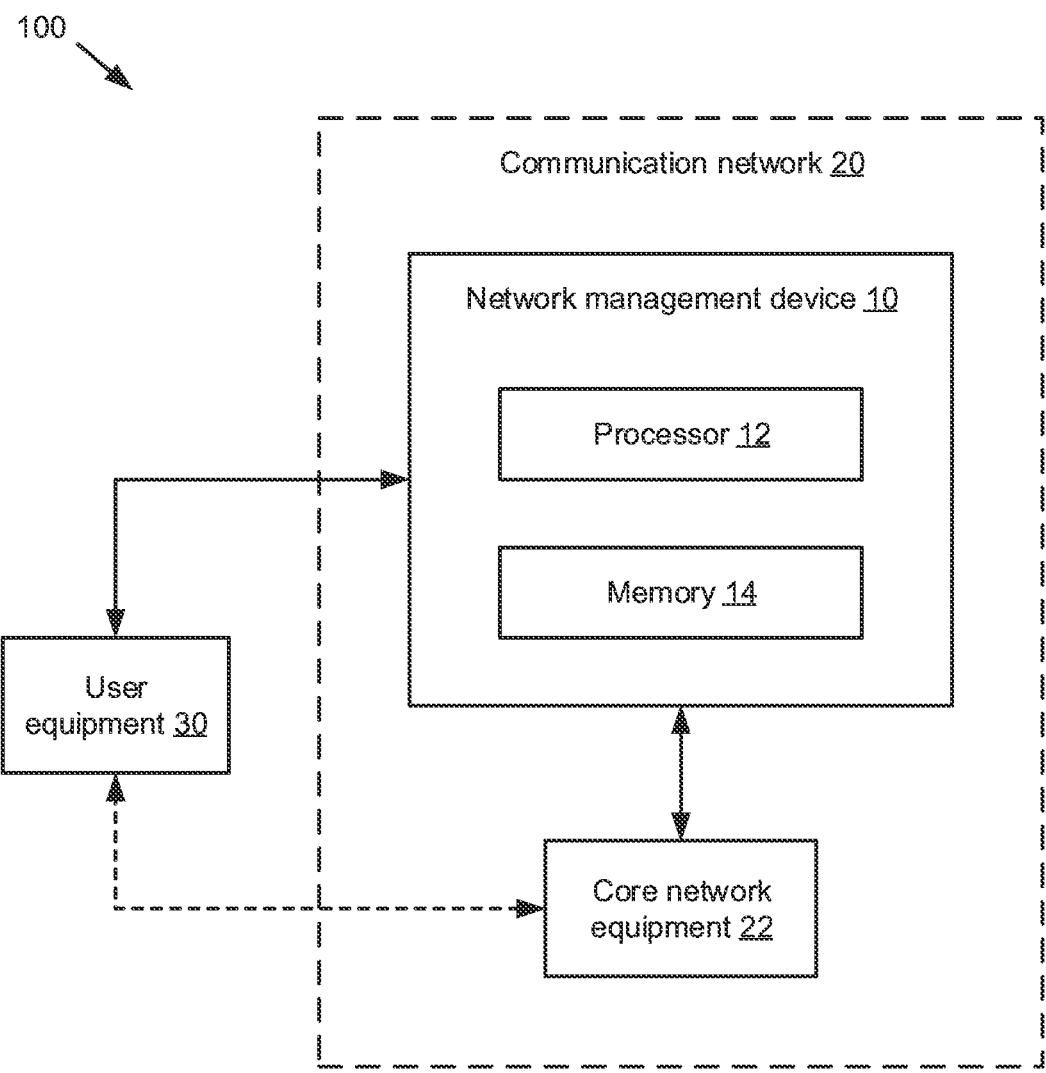
FIG. 1 is a block diagram of a system that facilitates traffic steering for NPNs and PLMN clouds in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include retrieving, by a system including a processor and associated with a communication network, a subscriber profile for a user equipment in response to receiving a request from the user equipment for access to the communication network, where the request includes first data network information that is distinct from second data network information associated with the communication network. In response to an attribute of the subscriber profile being determined to be equal to a defined value, the method can further include replacing, by the system, the first data network information in the request with the second data network information and routing, by the system, the request to core network equipment of the communication network.

In another aspect, a system as described herein can include a processor and a memory that stores executable instructions that, when executed by the processor, facilitate performance of operations. The operations can include, in response to receiving a request to connect to a communication network from a network device, retrieving a subscriber profile for the network device, where the request includes first network information that is distinct from second network information associated with the communication network. In response to determining that an attribute of the subscriber profile is equal to a defined value, the operations can further include replacing the first network information in the request with the second network information and routing the request to core network equipment of the communication network.

In a further aspect, a non-transitory machine-readable medium as described herein can include executable instructions that, when executed by a processor, facilitate performance of operations. The operations can include receiving, from a mobile device, a connection request for access to a communication network, the connection request including first network identification data that is distinct from second network identification data associated with the communication network; comparing a value of a field in a subscriber profile, established for the mobile device by the communication network, to a defined value; in response to the value of the field being equal to the defined value, replacing the first network identification data in the connection request with the second network identification data; and in response to the replacing of the first network identification data being completed, directing the connection request to core network equipment of the communication network.

Referring first to FIG. 1, a system 100 that facilitates traffic steering for non-public networks (NPNs) and public land mobile network (PLMN) clouds is illustrated. System 100 as shown by FIG. 1 includes a network management device 10 associated with a communication network 20. The communication network 20 can be, for example, a public network (e.g., a PLMN managed by a network carrier or operator), a private network or NPN, a hybrid public/private network (e.g., a network that includes both public and private infrastructure), and/or any other network type. While various examples provided herein relate to an NPN, it is noted that these examples are provided merely for purposes of explanation and that various implementations described herein are not intended to be limited to a specific network type unless explicitly stated otherwise.

The communication network 20 to which the network management device 10 is associated can be a network operating according to any suitable wireless communication technology, such as a cellular network (e.g., a Fourth Generation (4G) Long Term Evolution (LTE) network, a Fifth Generation (5G) New Radio (NR) network, etc.), a Wireless Fidelity (Wi-Fi) network, a BLUETOOTH® network, and/or any other suitable network technology, either presently existing or developed in the future.

As further shown in FIG. 1, the communication network 20 of system 100 can include core network equipment 22, which can implement various network functions and/or perform other operations associated with providing communication service within the communication network 20. Examples of network functions that can be implemented via the core network equipment 22 are described in further detail below with respect to FIG. 6.

As additionally shown in FIG. 1, the communication network 20, through the network management device 10 and/or the core network equipment 22, can provide communication service for user equipment (UE) 30. In various implementations, a UE 30 can include and/or incorporate the functionality of a mobile phone, a computer (e.g., a laptop, desktop, and/or tablet computer), an autonomous vehicle or a vehicle communication system, an Internet of Things (IoT) device, and/or any other device suitable for communicating using resources enabled via the communication network 20. While only one UE 30 is shown in FIG. 1 for simplicity of illustration, it is noted that the communication network 20 could provide communication service for any suitable number of UEs 30 and/or other devices.

As will be discussed in further detail below, the UE 30 can communicate directly with some components of the communication network 20 while not communicating, or communicating indirectly, with other components of the communication network 20. For example, the UE 30 shown in system 100 can directly communicate with the network management device 10, as noted by a solid line, and indirectly communicate with the core network equipment 22, as noted by a dashed line. Other implementations are also possible.

In various implementations, the communication network 20 can be associated with identifying information that enables connection to the communication network 20 by UEs 30 and/or other devices. For example, in Long Term Evolution (LTE), a data network is described by an Access Point Name (APN), while in 5G a data network is described by a Data Network Name (DNN). In an example in which the communication network 20 is a 5G NPN, a set of devices such as the UE 30 can be configured with a DNN associated with the communication network 20, and/or other information such as an identifier for a network slice associated with the communication network 20, in order to access the NPN.

In the event that a device configured for communication in a given network moves to another network, e.g., an NPN or a PLMN, the APN/DNN on the device can be changed to the APN/DNN associated with the new network. However, changing the APN/DNN can be an intensive and error-prone manual process that requires pre-knowledge and precise entry of the APN/DNN of the new network. For example, this process often involves the user of a device seeking assistance from mobile operator support personnel, leading to dissatisfaction and degraded user experience. Furthermore, some devices (e.g., locked devices) do not permit manual alteration of network information.

In view of at least the above, the network management device 10 shown in FIG. 1 can enable a UE 30 to move seamlessly between communication networks, e.g., between two different NPNs or between an NPN and a PLMN, without manually altering any network information stored on the UE 30. By way of example, if a user works in a remote factory with its own NPN and uses a particular DNN to access the NPN, the user would not need to make manual DNN changes on his or her device upon leaving the factory and joining another factory with its own NPN. Also or alternatively, the network management device 10 can operate as described herein to enable an operator or network user to restrict a particular device from connecting to a particular NPN, e.g., by controlling the APN/DNN translation in the NPN. Other benefits of the network management device 10 can also be provided, e.g., in use cases where the intersection of new network and/or device technology with specific service offerings causes a conflict and an operator desires to resolve that conflict transparently to the end user.

The network management device 10 shown in system 100 can include a processor 12 and a memory 14, which can be utilized to facilitate various functions of the network management device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the network management device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

Figure 2:
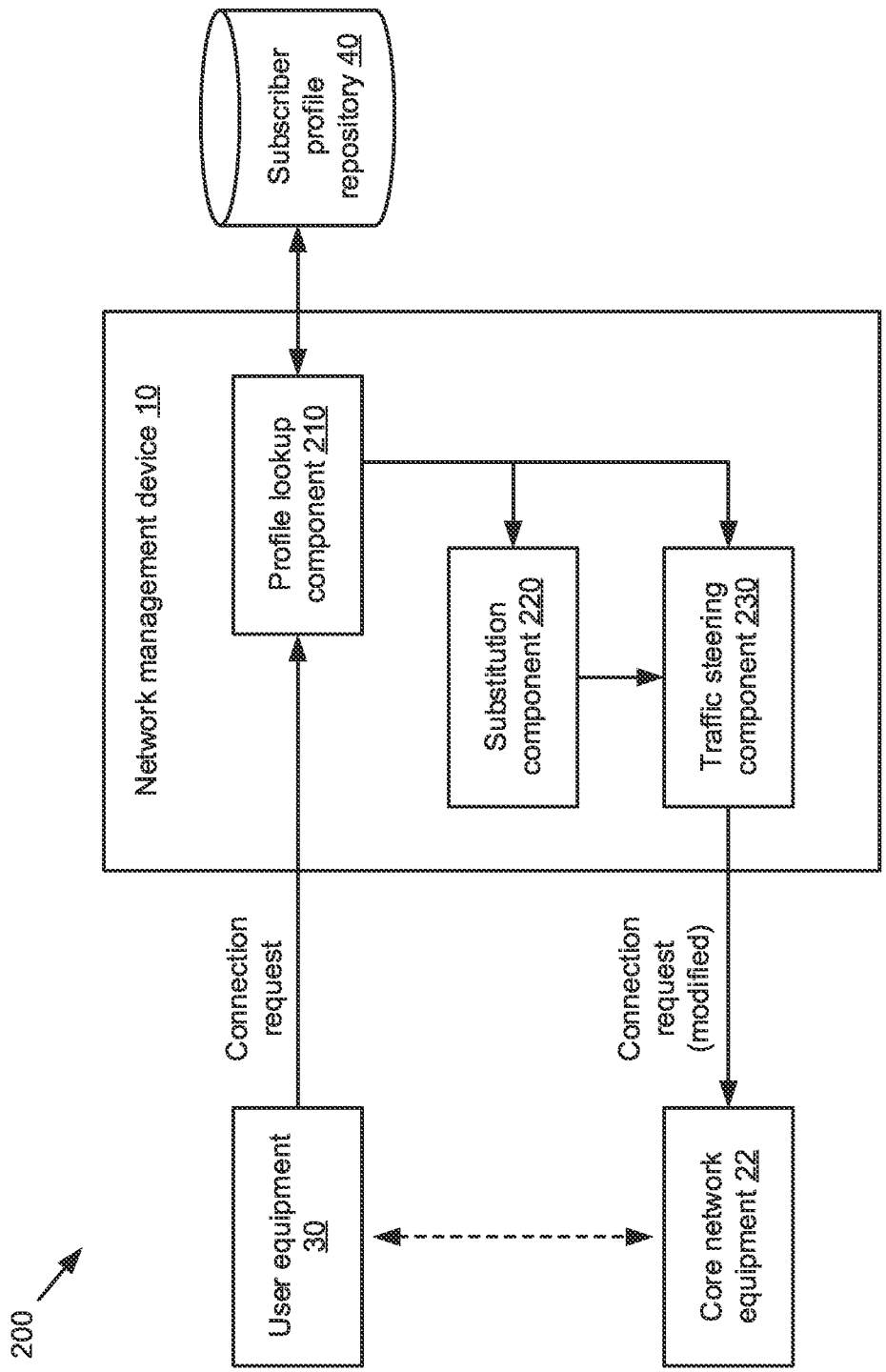
FIG. 2 is a block diagram that depicts the functionality of the network management device of FIG. 1 in further detail in accordance with various aspects described herein.

With reference now to FIG. 2, a block diagram of a system 200 that facilitates traffic steering for NPNs and PLMN clouds is illustrated. Repetitive description of like elements employed in other embodiments described herein is omitted for sake of brevity. System 200 as shown in FIG. 2 includes a network management device 10 that can operate in a similar manner to that described above with respect to FIG. 1. As further shown in FIG. 2, the network management device 10 includes a profile lookup component that can retrieve a subscriber profile for a UE 30 in response to an initiating event, such as receiving a request from the UE 30 for access to a communication network associated with the network management device 10 (e.g., the communication network 20 shown in FIG. 1, etc.).

In an implementation in which the profile lookup component 210 retrieves a subscriber profile for the UE 30 in response to the UE 30 providing a connection request message to the network management device 10, the connection request message can include data network information associated with a communication network for which the UE 30 is configured. By way of example, a connection request message sent by the UE 30 can contain an APN, DNN, and/or other network identification information that is stored on the UE 30 via a Subscriber Information Module (SIM) profile and/or other configuration information associated with the UE 30.

In response to receiving a connection request from the UE 30 as described above, the profile lookup component 210 can compare the data network information provided in the request to the data network information associated with the communication network in which the network management device 10 operates. If the data network information in the request sent by the UE 30 differs from the data network information associated with the communication network, e.g., due to the UE 30 having moved between communication networks, the profile lookup component 210 can determine, based on information present in the subscriber profile for the UE 30, whether to enable communication by the UE 30 within the communication network despite the difference in data network information. As a result, the profile lookup component 210 can enable the UE 30 to access the communication network without the need for manually updating the data network information stored on the UE 30 to match the data network information associated with the communication network.

To the above end, the profile lookup component 210 can retrieve subscriber profile data for a given UE 30 from a subscriber profile repository 40 for the network(s) associated with the network management device 10. In an implementation in which the network management device 10 operates in a 5G network, the subscriber profile repository 40 can be implemented by a Unified Data Repository (UDR) and/or other suitable data stores. Other implementations could also be used. Upon retrieving a subscriber profile for the UE 30 from the subscriber profile repository 40, the profile lookup component 210 can determine whether the value of a field, attribute, or other information present in the subscriber profile is equal to a defined value. If the value present in the subscriber profile is equal to the defined value, the network management device 10 can enable access by the UE 30 to the communication network via a substitution component 220 and a traffic steering component 230 as described below. This process can also be combined with device authentication, e.g., as will be discussed in further detail below with respect to FIGS. 3-4.

In an aspect, the field, attribute, and/or other information utilized by the profile lookup component 210 from a subscriber profile can correspond to existing unused attributes present in the subscriber profile, such as a charging characteristic attribute and/or any other suitable attributes. Also or alternatively, a new field or attribute could be utilized. The attribute(s) of the subscriber profile used for this purpose can be set by the communication network in advance of the request shown by FIG. 2, e.g., as will be further discussed below with respect to FIG. 5.

The substitution component 220 of the network management device 10, in response to the subscriber profile for the UE 30 being configured for access to an associated communication network as described above, can modify the connection request from the UE 30, e.g., by replacing the data network information provided by the UE 30 in the request with the data network information for the associated communication network. As this substitution is performed on the network side by the network management device 10 via the substitution component 220, the substitution can be performed transparently to the UE 30, e.g., without modifying any information stored on the UE 30. In an implementation in which the network management device 10 operates in a 5G network, the substitution component 220 can utilize an APN Network Identifier (APN-NI) replacement process to modify the connection request, e.g., as described in further detail below with respect to FIG. 7.

Based on a modified connection request as created by the substitution component 220, the traffic steering component can route and/or otherwise direct the modified connection request, and/or other data traffic associated with the UE 30, to core network equipment 22 of the communication network. Subsequently, data traffic can be routed between the UE 30 and the core network equipment 22 either directly or indirectly, e.g., via a radio access network (RAN) associated with the core network equipment 22 and/or other means, with or without further intervention from the network management device 10.

Figure 3:
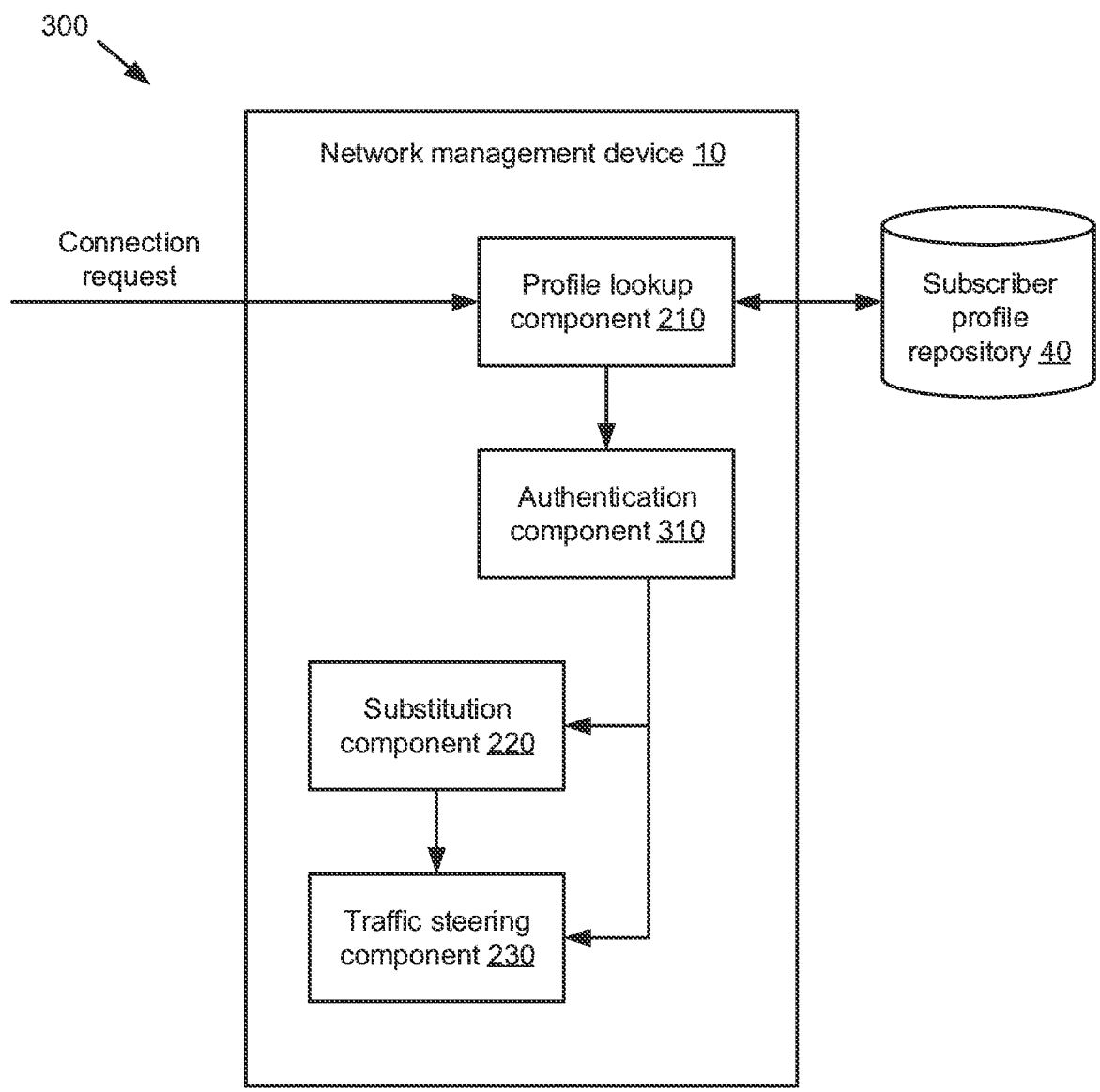
FIGS. 3-4 are respective block diagrams of a system that facilitates device authentication and traffic steering in a private network in accordance with various aspects described herein.

Turning now to FIG. 3, a block diagram of a system 300 that facilitates device authentication and traffic steering in a private network is illustrated. Repetitive description of like elements employed in other embodiments described herein is omitted for sake of brevity. System 300 as shown in FIG. 3 includes a network management device 10 that incorporates a profile lookup component 210 that retrieves a subscriber profile (e.g., from a UE 30 as shown in FIG. 2) in response to a connection request in a similar manner to that described above with respect to FIG. 2. As further shown by FIG. 3, the network management device 10 of system 300 further includes an authentication component 310 that can authenticate a device from which the connection request was sent, e.g., a UE or the like, in response to the profile lookup component 210 retrieving the subscriber profile for the device.

In an aspect, the authentication component 310 can determine whether to authenticate a requesting device on a communication network associated with the network management device 10 using one or more authentication techniques known in the art, e.g., by determining whether authentication credentials provided with the connection request are valid and correspond to the requesting device. Also or alternatively, the authentication component 310 can compare the value of a given attribute of the subscriber profile for the requesting device to a defined value, e.g., as described above, to determine whether to enable network translation for the requesting device. If authentication of a requesting device is successful and the authentication component 310 determines that the subscriber profile of the requesting device is configured for network translation, the authentication component 310 can provide the connection request to the substitution component 220 and the traffic steering component 230 to enable traffic routing for the requesting device, e.g., as described above with respect to FIG. 2.

Figure 4:
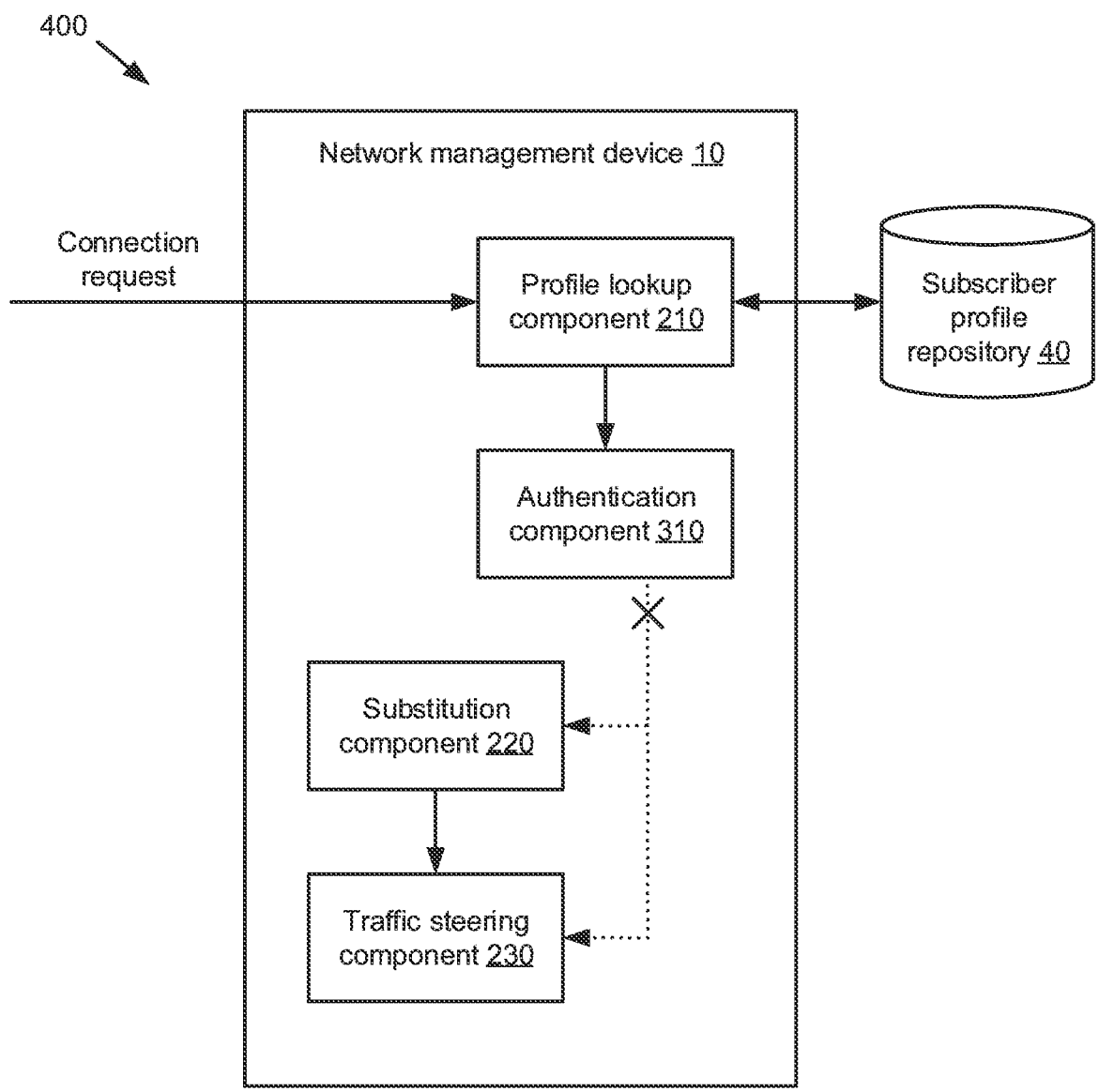

Alternatively, as shown by FIG. 4, if authentication of the requesting device fails or the authentication component 310 determines that the subscriber profile of the requesting device is not configured for network translation, the authentication component 310 can instead deny network access by the requesting device, e.g., by blocking the request from being processed by the substitution component 220 or the traffic steering component 230. In an example in which initial authentication of a requesting device succeeds but the authentication component 310 determines that the requesting device is not configured for network translation, the authentication component 310 can facilitate transmission of a response message to the requesting device, e.g., that instructs a user of the requesting device to contact an operator of the associated communication network and/or manually change the network information associated with the requesting device.

Figure 5:
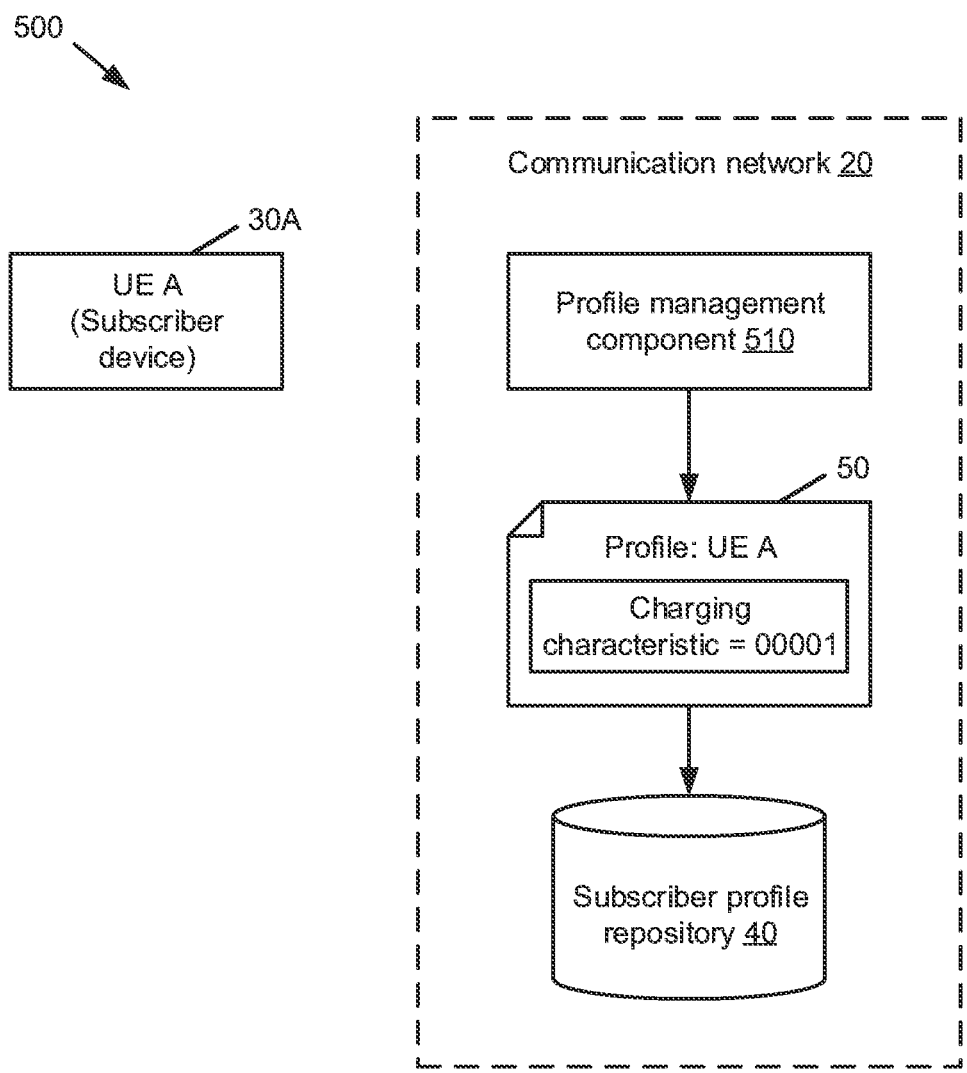
FIG. 5 is a block diagram of a system that facilitates configuring a user profile for traffic routing in a communication network in accordance with various aspects described herein.

Referring now to FIG. 5, a block diagram of a system 500 that facilitates configuring a user profile for traffic routing in a communication network is provided. Repetitive description of like elements employed in other embodiments described herein is omitted for sake of brevity. System 500 as shown in FIG. 5 includes a profile management component 510 associated with a communication network 20. In some implementations, the profile management component 510 can be associated with a network management device 10 (not shown in FIG. 5) as described above. Also or alternatively, the profile management component 510 can be implemented separately from such a device.

In an aspect, the profile management component 510 can create, and/or otherwise populate, a subscriber profile 50 corresponding to a UE 30A that is a subscriber device associated with the communication network 20. Creation and/or population of a subscriber profile 50 can be performed by the profile management component 510 at any suitable time, e.g., during a first-time setup of the UE 30A in the communication network 20 and/or at any other suitable time prior to a connection request being sent by the UE 30A to the communication network 20 as described above. While FIG. 5 illustrates an example in which the profile management component 510 prepares a single subscriber profile 50 for a single UE 30A, it is noted that the profile management component 510 could perform operations on any suitable number of subscriber profiles 50 at a given time, e.g., as a batch operation.

As further shown in FIG. 5, the profile management component 510 can configure the UE 30A for automated network translation and traffic routing within the communication network 20 by populating and/or otherwise setting an attribute of the subscriber profile 50 for the UE 30A, here a charging characteristic attribute, to a defined value, here a binary value of 00001. The subscriber profile 50 of the UE 30A containing the populated attribute can then be stored at a UDR and/or other suitable subscriber profile repository 40 associated with the communication network 20. Accordingly, in the event that the UE 30A subsequently transmits a request for access to the communication network 20, APN/DNN replacement and/or other operations can be performed to facilitate connection by the UE 30A to the communication network 20, e.g., as described above.

Figure 6:
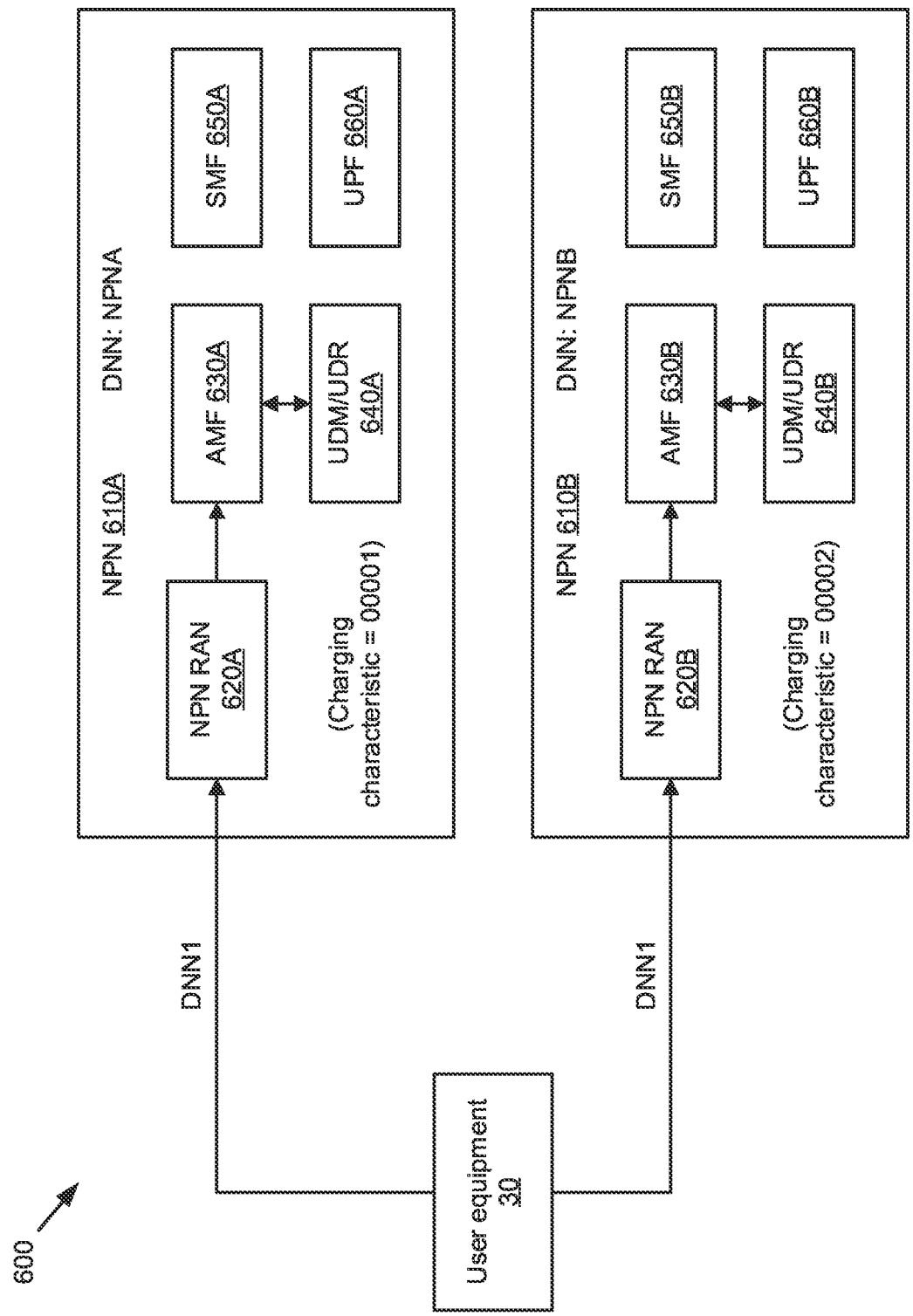
FIG. 6 is a diagram that depicts example traffic routing operations that can be performed by respective NPNs in accordance with various aspects described herein.

Turning to FIG. 6, a diagram 600 that depicts example traffic routing operations that can be performed by respective NPNs, here two NPNs 610A and 610B, is provided. Repetitive description of like elements employed in other embodiments described herein is omitted for sake of brevity. Additionally, it is noted that diagram 600 is merely one example of a multi-network environment in which implementations described herein can function, and that other environments, which could include different numbers and/or types of networks, are also possible.

As illustrated by diagram 600, a UE 30 can be configured for operation on a network with a DNN of DNN1, e.g., based on information associated with a SIM card or SIM profile at the UE 30 and/or other information locally stored on the UE 30. Subsequently, when the UE 30 attempts to connect to a new network, such as NPN 610A shown in diagram 600, it can use the old DNN (DNN1) associated with its stored information. This connection attempt can be routed through a RAN 620A associated with NPN 610A to an access and mobility management function (AMF) 630A of NPN 610A.

In response to successful authentication of the UE 30 by the AMF 630A, the AMF 630A can retrieve a profile for the UE 30 stored by Unified Data Management (UDM) and/or a UDR associated with NPN 610A, shown in diagram 600 as UDM/UDR 640A. Since the UE 30 as shown in diagram 600 broadcasts a DNN value of DNN1 that is different from the DNN NPNA that is associated with NPN 610A, the AMF 630A can decide, based on the value of an attribute in the retrieved subscriber profile, whether to perform network identifier replacement, traffic routing, and/or other operations for the UE 30.

Here, the AMF 630A evaluates the charging characteristic attribute of the subscriber profile. Based on the charging characteristic value being set to a defined value (e.g., 00001 as shown in diagram 600), the AMF 630A can facilitate DNN replacement in the request provided by the UE 30, e.g., from DNN1 as originally provided to NPNA. In an implementation, this substitution can be performed via APN Network Identifier (APN-NI) replacement, as will be described in further detail below with respect to FIG. 7. Additionally, the AMF 630A can facilitate routing of traffic associated with the UE 30 to other elements of NPN 610A, such as a session management function (SMF) 650A, a user plane function (UPF) 660A, or the like.

Similarly, in the event that the same UE 30 then moves from NPN 610A to NPN 610B, the UE 30 can attempt to connect to NPN 610B by broadcasting DNN1 to NPN 610B. The connection request can be routed through a RAN 620B associated with NPN 610B to an AMF 630B, which can retrieve a subscriber profile for UE 30 from a UDM/UDR 640B and evaluate a charging characteristic and/or other suitable attribute in the subscriber profile in a similar manner to the AMF 630A described above. In response to determining that the attribute is set to a defined value (e.g., 00002 as shown in diagram 600), the AMF 630B can perform network substitution and traffic routing to an SMF 650B, UPF 660B, and/or other network elements in a similar manner to NPN 610A as described above.

As shown in diagram 600, defined attribute values as described above can be set individually by respective networks, such as NPN 610A and NPN 610B shown in diagram 600. Accordingly, attribute values utilized by respective networks as described above could differ from network to network, e.g., as illustrated by the different charging characteristic values illustrated in diagram 600. In other examples, the attributes utilized by respective networks for initializing network translation could also differ. For instance, a first network could utilize a defined value of a charging characteristic value as described above, while a second network could utilize a defined value of a different attribute. In still other examples, an NPN or other network could utilize multiple defined values (e.g., 00001, 00002, 00003, and so on) to differentiate between different users or different classes and/or groups of users, each of which could trigger network translation in the same and/or different ways.

In both of the examples shown by diagram 600, the UE 30 sends a connection request that specifies DNN1, and NPNs 610A and 610B can perform translation and routing on the network side to route traffic within the respective networks as appropriate. Accordingly, NPNs 610A and 610B can enable the UE 30 to connect to the respective networks without the network information stored on the UE 30 being changed between networks, thereby eliminating the possibility for errors associated with manual alteration of the stored network information.

Figure 7:
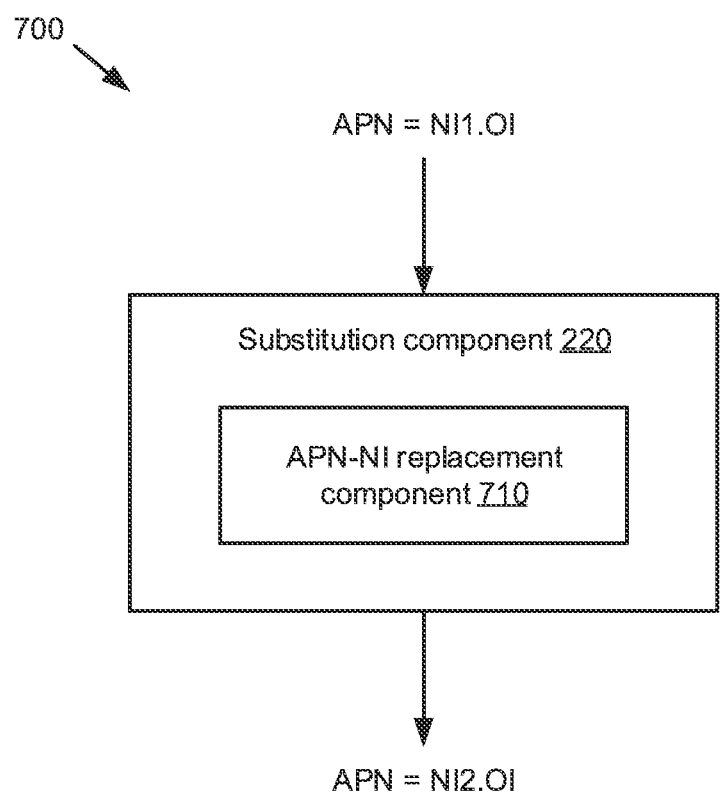
FIG. 7 is a block diagram of a system that facilitates traffic routing via network identifier replacement in accordance with various aspects described herein.

Referring next to FIG. 7, a block diagram of a system 700 that facilitates traffic routing via network identifier replacement is provided. Repetitive description of like elements employed in other embodiments described herein is omitted for sake of brevity. System 700 includes a substitution component 220 that can substitute first network identification data provided in a connection request, e.g., an APN/DNN, with second network identification data associated with the communication network in which the substitution component 220 operates, e.g., as described above.

The substitution component 220 shown in FIG. 7 includes an APN-NI replacement component 710, which can facilitate substitution of network identification data via network identifier replacement operations. In an example as shown by FIG. 7, an original request received by the substitution component 220 can include an APN, which can in turn include a network identifier (NI) and/or other parameters, such as an operator identifier (OI) or the like. In response to determining that network identification replacement is to be performed for the request, the APN-NI replacement component can utilize APN-NI replacement to alter the received APN, e.g., from a first APN of NI1.OI to a second APN of NI2.OI, where NI2 is the network identifier for the communication network associated with the substitution component 220.

Figure 8:
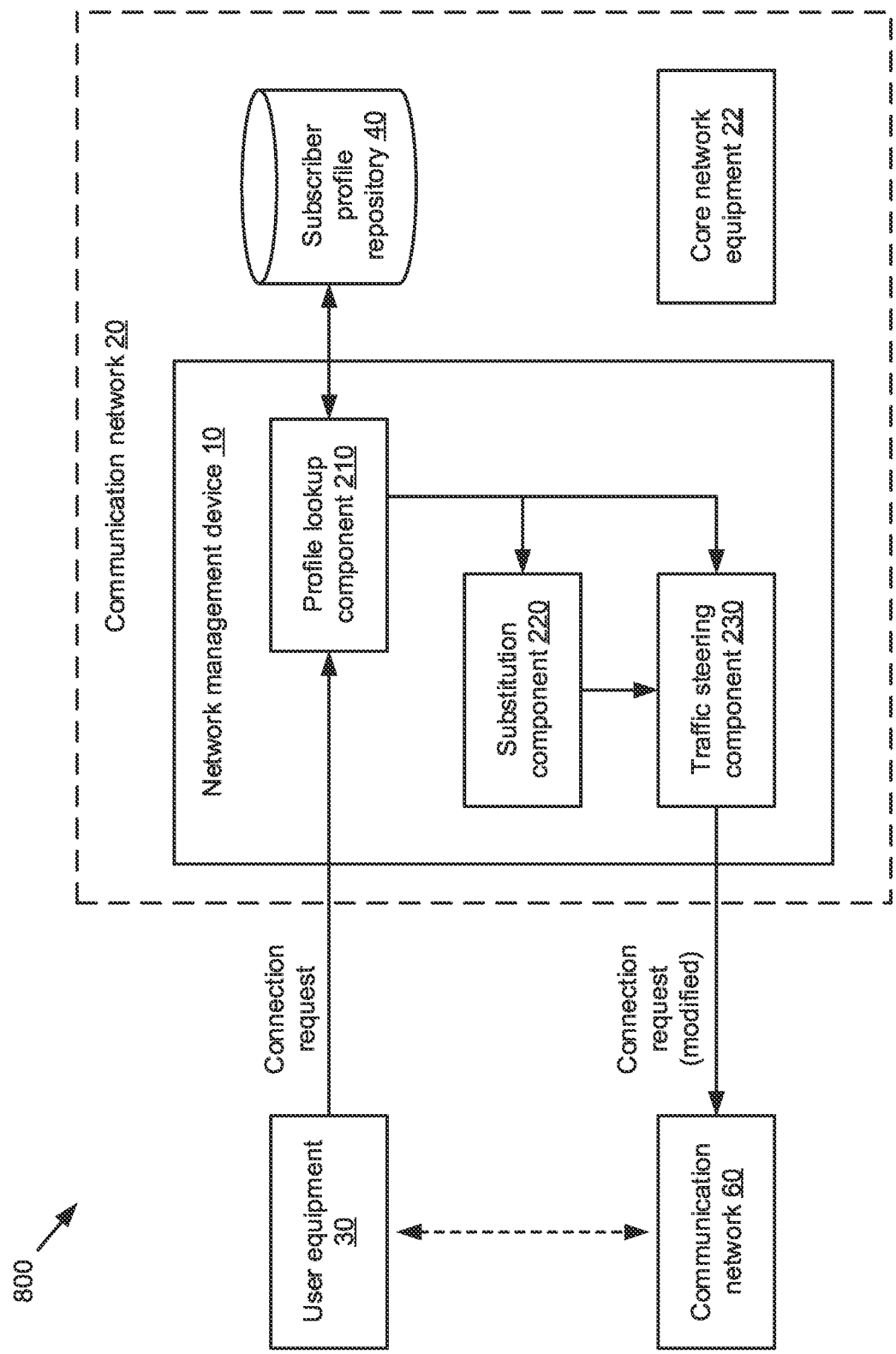
FIG. 8 is a block diagram of a system that facilitates inter-network traffic routing in accordance with various aspects described herein.

Turning to FIG. 8, a block diagram of a system 800 that facilitates inter-network traffic routing is illustrated. Repetitive description of like elements employed in other embodiments described herein is omitted for sake of brevity. System 800 as shown in FIG. 8 includes a network management device 10 that can perform network translation and traffic routing for a UE 30 in a similar manner to that described above with respect to FIG. 2.

In the implementation shown by FIG. 8, the traffic steering component 230 can facilitate inter-network traffic routing, e.g., by routing traffic associated with the UE 30 from a communication network 20 associated with the network management device 10 to a different communication network 60. This can be done, for example, to facilitate an environment in which a single communication network 20 provides network substitution and traffic routing functionality for other networks, such as the communication network 60. In another example, the traffic steering component 230 can route traffic to a different communication network 60 based on service availability, e.g., by routing traffic from the communication network 20 associated with the network management device 10 to another communication network 60 in response to the UE 30 requesting a service that is not available at the communication network 20. Other examples are also possible.

Figure 9:
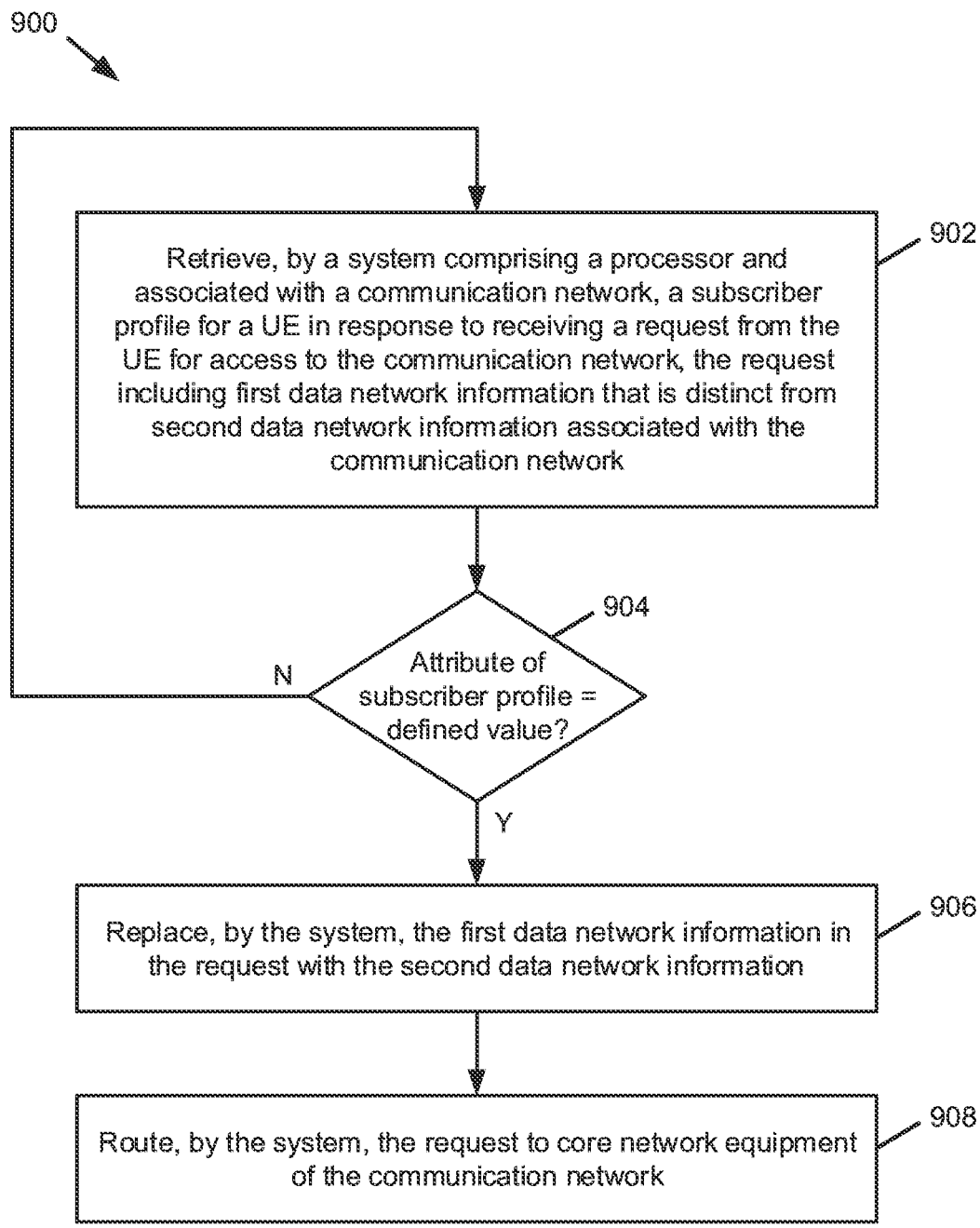
FIG. 9 is a flow diagram of a method that facilitates traffic steering for NPNs and PLMN clouds in accordance with various aspects described herein.

With reference now to FIG. 9, a flow diagram of a method 900 that facilitates traffic steering for NPNs and PLMN clouds is presented. At 902, a system comprising a processor (e.g., a network management device 10 comprising a processor 12, and/or a system including such a device) and associated with a communication network (e.g., a communication network 20) can retrieve (e.g., by a profile lookup component 210 and/or other components implemented by the processor 12) a subscriber profile for a UE (e.g., a UE 30) in response to receiving a request from the UE for access to the communication network. The request can include first data network information that is distinct from second data network information associated with the communication network.

At 904, the system can determine (e.g., by the profile lookup component 210) whether an attribute of the subscriber profile retrieved at 902 is equal to a defined value. If the attribute of the subscriber profile does not match the defined value, method 900 can return to 902 to process other requests. Otherwise, method 900 can proceed to 906, in which the system can replace (e.g., by a substitution component 220 and/or other components implemented by the processor 12) the first data network information in the request received at 902 with the second data network information, e.g., the data network information associated with the communication network.

At 908, the system can route (e.g., by a traffic steering component 230 and/or other components implemented by the processor 12) the request received at 902, and/or other network traffic associated with the UE, to core network equipment (e.g., core network equipment 22) of the communication network.

FIG. 9 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
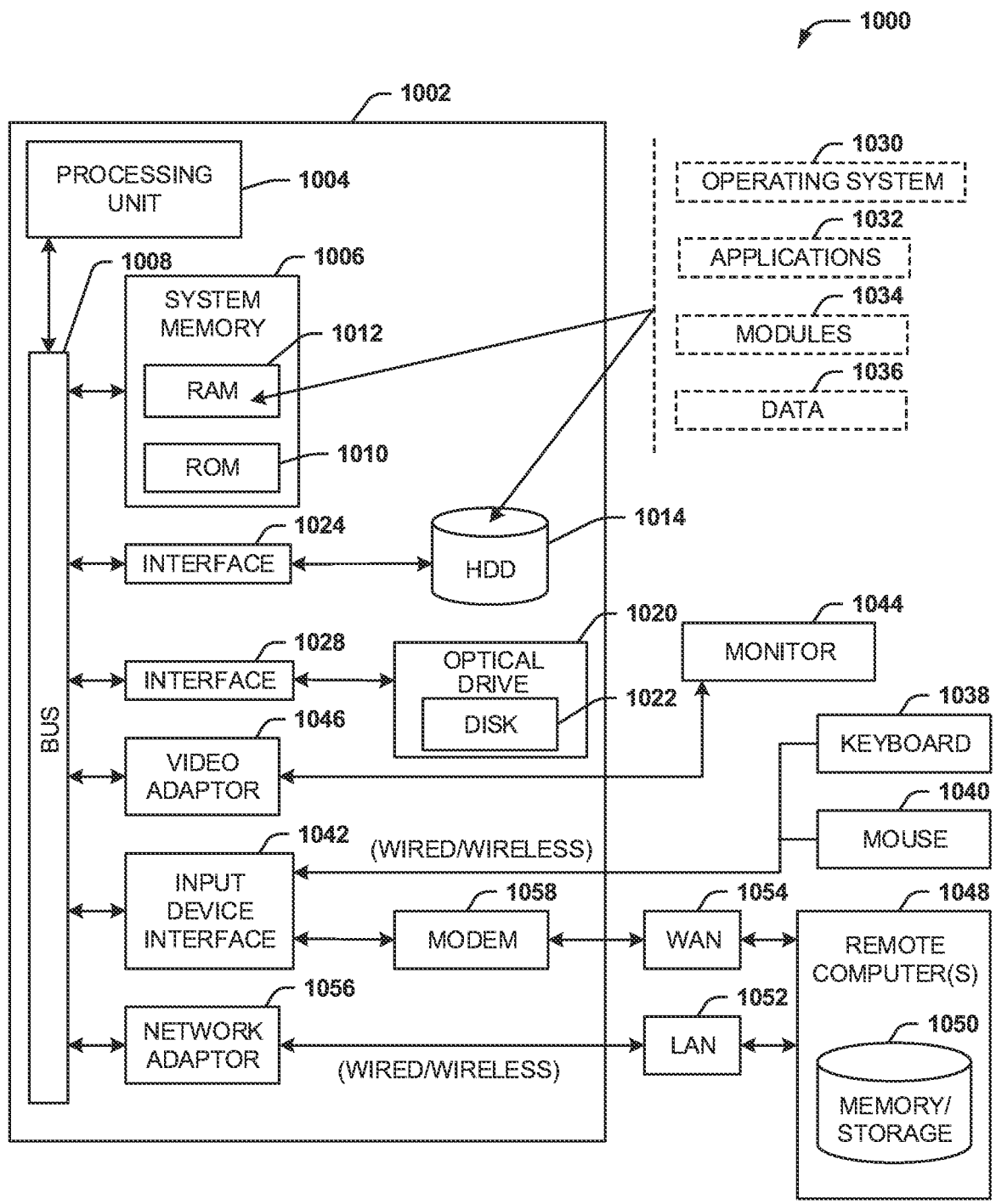
FIG. 10 depicts an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 and an optical disk drive 1020, (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014 and optical disk drive 1020 can be connected to the system bus 1008 by an HDD interface 1024 and an optical drive interface 1028, respectively. The HDD interface 1024 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    creating, by a system comprising a processor and associated with a communication network, a subscriber profile for a user equipment, wherein the creating of the subscriber profile comprising setting an attribute of the subscriber profile to a defined value;
    retrieving, by the system, the subscriber profile for the user equipment in response to receiving a request from the user equipment for access to the communication network, wherein the request comprises first data network information that is distinct from second data network information associated with the communication network; and
    in response to an attribute of the subscriber profile being determined to be equal to the defined value:
        replacing, by the system, the first data network information in the request with the second data network information; and
        routing, by the system, the request to core network equipment of the communication network.

2. The method of claim 1, wherein the attribute of the subscriber profile is a charging characteristic attribute.

3. The method of claim 1, further comprising:
    authenticating, by the system, the user equipment in response to retrieving the subscriber profile for the user equipment.

4. The method of claim 3, wherein the replacing of the first data network information and the routing of the request are further in response to the authenticating being determined to be successful.

5. The method of claim 1, wherein the first data network information is a first network identifier contained in an access point name.

6. The method of claim 5, wherein the request comprises the access point name.

7. The method of claim 5, wherein the second data network information is a second network identifier associated with the communication network, and wherein the replacing of the first data network information comprises replacing the first network identifier with the second network identifier via a network identifier replacement operation.

8. The method of claim 1, wherein the replacing of the first data network information comprises replacing, by an access and mobility management function enabled by the system, the first data network information.

9. The method of claim 1, wherein the communication network is a non-public network.

10. A system, comprising:
a processor; and
a memory that stores executable instructions that, when executed by the processor, facilitate performance of operations, comprising:
generating a subscriber profile for a network device, the generating of the subscriber profile comprising setting an attribute of the subscriber profile to a defined value;
in response to receiving a request to connect to a communication network from thea network device, retrieving the subscriber profile for the network device, wherein the request comprises first network information that is distinct from second network information associated with the communication network; and
in response to determining that the attribute of the subscriber profile is equal to thea defined value:
replacing the first network information in the request with the second network information; and
routing the request to core network equipment of the communication network.

11. The system of claim 10, wherein the attribute of the subscriber profile is a charging characteristic attribute.

12. The system of claim 10, wherein the operations further comprise:
authenticating the network device with the communication network in response to retrieving the subscriber profile for the network device.

13. The system of claim 12, wherein the routing of the request are further in response to the authenticating being determined to be successful.

14. The system of claim 13, wherein the replacing of the first network information is further in response to the authenticating being determined to be successful.

15. The system of claim 10, wherein the request comprises an access point name, wherein the first network information is a first network identifier contained in the access point name, wherein the second network information is a second network identifier associated with the communication network, and wherein the replacing of the first network information comprises replacing the first network identifier with the second network identifier via a network identifier replacement operation.

16. A non-transitory machine-readable medium, comprising executable instructions that, when executed by a processor, facilitate performance of operations, comprising:
receiving, from a mobile device, a connection request for access to a communication network, the connection request comprising first network identification data that is distinct from second network identification data associated with the communication network;
comparing a value of a field in a subscriber profile, established for the mobile device by the communication network, to a defined value;
in response to the value of the field being equal to the defined value, replacing the first network identification data in the connection request with the second network identification data; and
in response to the replacing of the first network identification data being completed, directing the connection request to core network equipment of the communication network.

17. The non-transitory machine-readable medium of claim 16, wherein the field of the subscriber profile is a charging characteristic field.

18. The non-transitory machine-readable medium of claim 16, wherein the operations further comprise:
in response to receiving the connection request, authenticating the mobile device with the communication network, wherein the replacing of the first network identification data is further in response to the authenticating being determined to be successful.

19. The non-transitory machine-readable medium of claim 16, wherein the operations further comprise:
populating, prior to the receiving of the connection request, the field in the subscriber profile with the defined value.

20. The non-transitory machine-readable medium of claim 16, wherein the connection request comprises an access point name, wherein the first network identification data comprises a first network identifier contained in the access point name, wherein the second network identification data comprises a second network identifier associated with the communication network, and wherein the replacing of the first network identification data comprises replacing the first network identifier with the second network identifier via a network identifier replacement operation.

* * * * *

UNITED STATES PATENT AND TRADEMARK OFFICE
CERTIFICATE OF CORRECTION

| | | |
|---|---|---|
| PATENT NO. | : 12,452,732 B2 | Page 1 of 1 |
| APPLICATION NO. | : 17/804421 | |
| DATED | : October 21, 2025 | |
| INVENTOR(S) | : Prashant Raghuvanshi et al. | |

It is certified that error appears in the above-identified patent and that said Letters Patent is hereby corrected as shown below:

In the Claims

In Column 15, Line 17, replace "thea" with "the" in Claim 10.

Signed and Sealed this
Eighteenth Day of November, 2025

John A. Squires
*Director of the United States Patent and Trademark Office*